United States Patent [19]

Nguyen

[11] Patent Number: 5,483,542
[45] Date of Patent: * Jan. 9, 1996

[54] BYTE ERROR RATE TEST ARRANGEMENT

[75] Inventor: Khanh C. Nguyen, Whitehall Township, Leigh County, Pa.

[73] Assignee: AT&T Corp., Murray Hill, N.J.

[*] Notice: The portion of the term of this patent subsequent to Feb. 22, 2011, has been disclaimed.

[21] Appl. No.: 10,098

[22] Filed: Jan. 28, 1993

[51] Int. Cl.$^6$ .................................................. G06F 11/00
[52] U.S. Cl. ........................... 371/5.1; 375/276; 379/83; 379/84
[58] Field of Search .............................. 371/5.1, 5.2, 5.3, 371/20.4, 24, 25.1, 37.1, 37.2, 37.3, 37.4, 37.7, 38.1; 364/265, 266.4; 395/575; 375/49, 16, 28; 379/83, 84

[56] References Cited

U.S. PATENT DOCUMENTS

| | | | |
|---|---|---|---|
| 3,576,982 | 5/1971 | Duke | 371/5.1 |
| 4,358,848 | 11/1982 | Patel | 371/39.1 |
| 4,507,782 | 3/1985 | Kunimasa et al. | 371/32 |
| 4,527,269 | 7/1985 | Wood et al. | 371/37.1 |
| 4,599,722 | 7/1986 | Mortimer | 371/37 |
| 4,672,612 | 6/1987 | Shishikura et al. | 371/37.1 |
| 4,963,868 | 10/1990 | Takayama et al. | 375/112 |
| 5,023,872 | 6/1991 | Annamalai | 371/5.1 |
| 5,289,473 | 2/1994 | Nguyen | 371/5.1 |
| 5,353,308 | 10/1994 | Whetsel, Jr. | 371/22.3 |

OTHER PUBLICATIONS

"2.4 Gb/s Sonet Multiplexer/Demultiplexer with Frame Detection Capability", *IEEE Journal on Selected Areas In Communications*, vol. 9, No. 5, Jun. 1991 Dennis T. Kong.

*Primary Examiner*—Robert W. Beausoliel, Jr.
*Assistant Examiner*—Dieu-Minh Le
*Attorney, Agent, or Firm*—Wendy W. Koba

[57] ABSTRACT

An arrangement is disclosed for determining a byte error rate (ByER) of a received digital signal. In particular, a local byte clock signal is generated and a complement of the received signal (or clock signal) is compared to the clock signal (or received signal). When both are the same logic value, as determined by a series of logic gates, an error is deemed to have occurred. A counter is utilized to track a number of occurrences N over a predetermined period of time T. The byte error rate is then determined from the relation $$\frac{N/T}{C}.$$

12 Claims, 3 Drawing Sheets

BYTE ERROR RATE TEST ARRANGEMENT

BACKGROUND OF THE INVENTION

1. Technical Field

The present invention relates to an error rate test arrangement and, more particularly, to an arrangement for determining the byte error rate (ByER) of a recovered data signal.

2. Description of the Prior Art

In digital data communication systems, a sequence of bits (i.e., a signal comprising binary digits) originates from a transmitter and is transmitted through a communications channel to a receiver. If the communication channel were perfect, the sequence of bits received at the receiver would be identical to the transmitted data bits. However, communications channels are not perfect and, because of the presence of noise and other spurious signals, the received data may very well not be the same as the transmitted data. Accordingly, systems have been designed to detect and correct errors occurring in sequences of received data. Such systems determine if some of the bits of the received data differ from the transmitted data, and thereafter correct the error or errors.

There are many commercially available arrangements for monitoring the received bit stream and providing error correction, for one bit at a time. Indeed, many systems list as a criteria a maximum bit error rate (BER) as one specification to monitor system performance. However, as the systems evolve and the needs of the designers change, it is becoming more desirable to also monitor and correct for "byte" errors, where a "byte" is commonly defined as a string of eight bits. A need remains in the art, therefore, for a relatively simple way for monitoring the byte error rate of a digital communication system.

SUMMARY OF THE INVENTION

The need remaining in the prior art is addressed by the present invention which relates to an error rate test arrangement and, more particularly, to an arrangement for determining the byte error rate (ByER) of a recovered data signal.

In accordance with an exemplary embodiment of the present invention, a recovered data signal is inverted and then clocked with a locally-generated standard byte clock. The output is then provided to a counter, which will increment every time the byte clock is coincident with the complement of the data signal. The ByER may then be determined by calculating the number of coincidences during a given period of time.

It is an advantage of the present invention that the ByER may be simply determined using a microprocessor, or other similar device, where the microprocessor contains the value of the standard byte rate and controls the counting process. The microprocessor can then simply determine the ByER using the following relation:

$$ByER = \frac{N/T}{C},$$

where N is defined as the total number of counts from the counter (i.e., the number of byte rate errors), T is the elapsed count time, and C is the standard byte clock frequency.

In one embodiment of the present invention, the received signal (S) may be applied to an inverter to form the complement ($\overline{S}$) of the data signal. The complement signal ($\overline{S}$) is subsequently applied as a first input to an AND gate, where the byte clock (C) is coupled to the remaining input of the AND gate. The AND gate output (E) is then applied as an input to a counter for monitoring the occurrences of coincidences. Alternatively, a series of NAND gates may be interconnected to provide the same function, where the NAND arrangement is simplified in that only a single integrated circuit is required.

Other and further embodiments and advantages of the present invention will become apparent during the course of the following discussion and by reference to the accompanying drawings.

BRIEF DESCRIPTION OF THE DRAWING

Referring now to the drawings, where like numerals represent like parts in several views.

DETAILED DESCRIPTION

Figure 1:
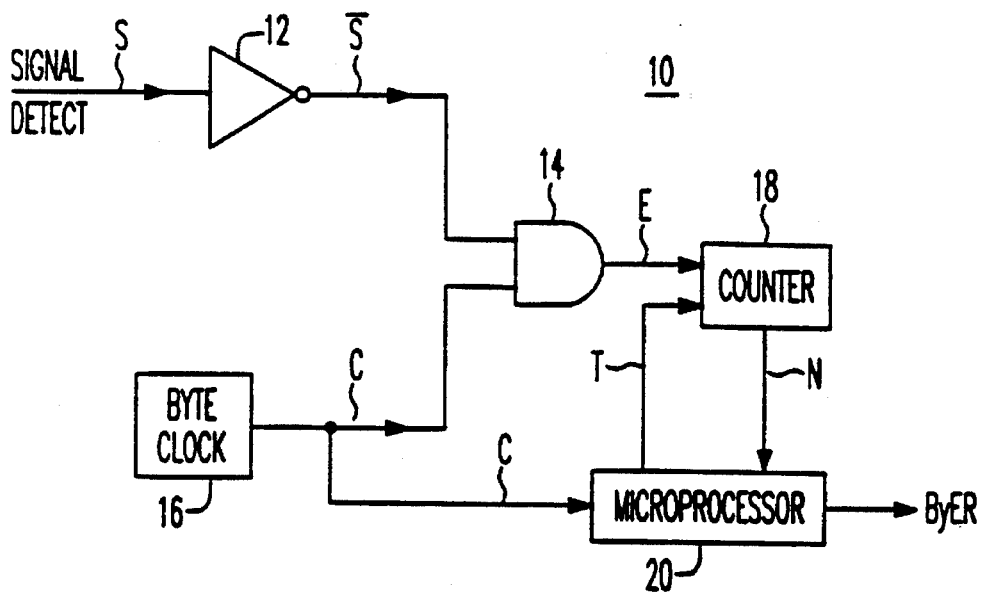
FIG. 1 illustrates an exemplary arrangement for providing byte error rate testing in accordance with the present invention.
Figure 2:
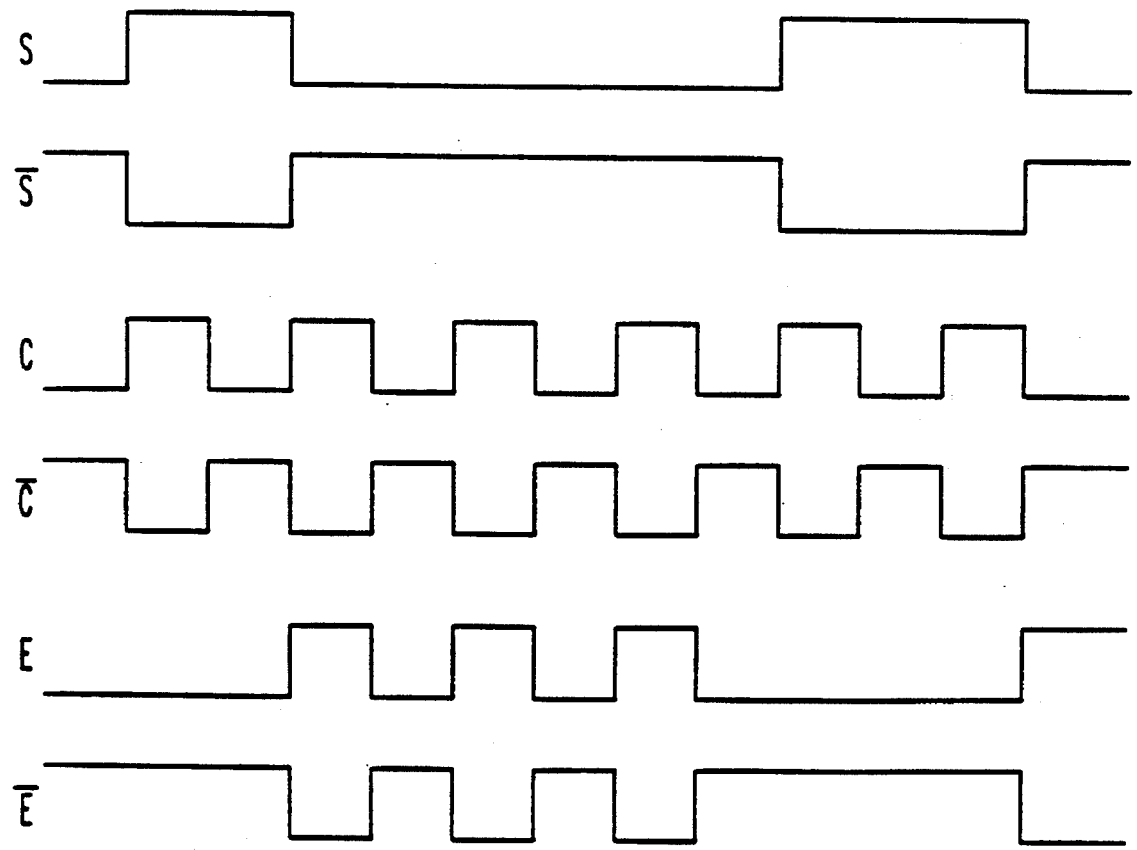
FIG. 2 contains timing diagrams of various signals generated in accordance with the teachings of the present invention.

FIG. 1 illustrates an exemplary byte error rate test arrangement 10 formed in accordance with the teachings of the present invention. As shown, a received data signal S (also denoted "signal detect" in FIG. 1) is applied as an input to an inverter 12. Inverter 12 functions, therefore, to form the complement, denoted $\overline{S}$ of the received data signal. Complement signal $\overline{S}$ is subsequently applied as a first input to an AND gate 14. The remaining input to AND gate 14 is a byte clock signal C, which is generated by a standard byte clock source 16. Source 16, located at the receiver, is chosen to provide a constant output at the byte rate determined by the system user. In particular, byte clock signal C will have a value of logic "1" at the beginning of each byte. The timing diagrams shown in FIG. 2 illustrate the various signals described thus far, namely, received signal S, complement signal $\overline{S}$, and byte clock signal C. The output of AND gate 14, denoted E and also illustrated in FIG. 2, will therefore have a value of logic "1" only when both signals $\overline{S}$ and C are logic "1"'s. Obviously, the coincidence of $\overline{S}$ of logic "1" with the beginning of a byte (as defined by a clock signal C of logic "1") indicates an error in byte rate of the received data signal. Thus, output error signal E from AND gate 14 will maintain an output value of logic "0" as long as there is no byte rate error present in the received data signal. However, when error signal E becomes a logic "1", a byte rate error has occurred.

In accordance with the teaching of the present invention the byte error rate is determined by providing the error output E from AND gate 14 as an input to a counter 18. Counter 18 functions to simply increment in value each time it receives a logic "1" signal input from the output of AND gate 14 (signal E). After a predetermined period of time T has elapsed, the total number of increments N of counter 18 is read out, and used to determine the ByER as defined above. For example, if the elapsed time T was 1200 seconds and the number of errors N was 3 for a byte clock C operating at 26 MHz (26 MHz=26×10⁶ cycles per sec), the ByER will be:

$$ByER = \frac{N/T}{C} = \frac{(3/1200)}{26 \times 10^6} = 96.154 \times 10^{-12}.$$

As shown in FIG. 1, a microprocessor 20 may be programmed to perform the calculation described above. In particular, microprocessor 20 receives as inputs to byte clock C and the total number of increments N. Microprocessor 20 may be configured to control the timing operation of the arrangement and provide the time control signal T to counter 18 such that when counter 18 receives the T signal, the total count N will be transferred to microprocessor 20. Using the relation described above, microprocessor 20 may then determine the ByER. An advantage of using a microprocessor is that the byte clock input may be modified as a function of time, at the desire of the user, without disturbing the output. Similarly, the elapsed time T may be modified by a microprocessor. In fact, the microprocessor may be configured to store progressive ByER values to enable a system designer to study the performance history of the system in terms of ByER.

Figure 3:
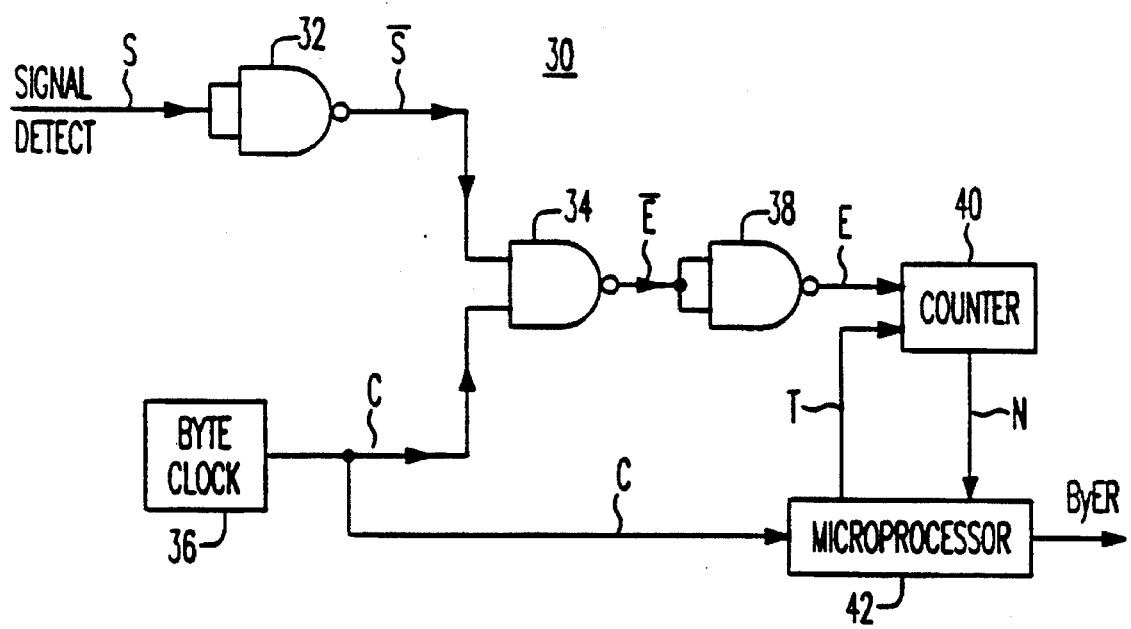
FIG. 3 illustrates an alternative embodiment of the present invention, utilizing a series of NAND gates.

FIG. 3 illustrates an alternative ByER detection arrangement 30. Arrangement 30, formed using a series of NAND gates, may be a preferred embodiment of the present invention, since a single integrated circuit may be used to form the complete logic arrangement. Similar to arrangement 10 described above, arrangement 30 receives as an input digital signal S detected by the receiver (not shown). Signal S is subsequently applied as both inputs to a first NAND gate 32. As is well-known in the art, when both inputs are identical, a NAND gate will function as an inverter. Therefore, first NAND gate 32 will provide as an output the complement signal $\overline{S}$ of the detected signal S. Complement signal $\overline{S}$ is subsequently applied as a first input to a second NAND gate 34. The remaining input to NAND gate 34 is the clock signal C from a byte clock source 36, which is essentially identical to byte clock source 16 described above. The output from NAND gate 34 will remain at a logic "1" value as long as either input signal $\overline{S}$ or C comprises a logic "0" value. As discussed above, when both $\overline{S}$ and C are simultaneously a logic "1" value, a byte clock error has occurred in the received signal S.

Returning to FIG. 3, when both $\overline{S}$ and C are logic "1" values, the output from NAND gate 34, denoted $\overline{E}$, will be a logic "0". A timing diagram of signal $\overline{E}$ is also shown in FIG. 2. This error output signal $\overline{E}$ from NAND gate 34 is subsequently inverted by a third NAND gate 38, which thus provides as an output the error signal E. As with arrangement 10 described above, error signal E is subsequently applied as an input to a counter 40, where counter 40 functions in a manner similar to counter 18 described above. After a predetermined period of time T, the total number N of errors may then be read out and the byte error rate determined. A microprocessor 42 may be used as described above to generate the ByER data.

Figure 4:
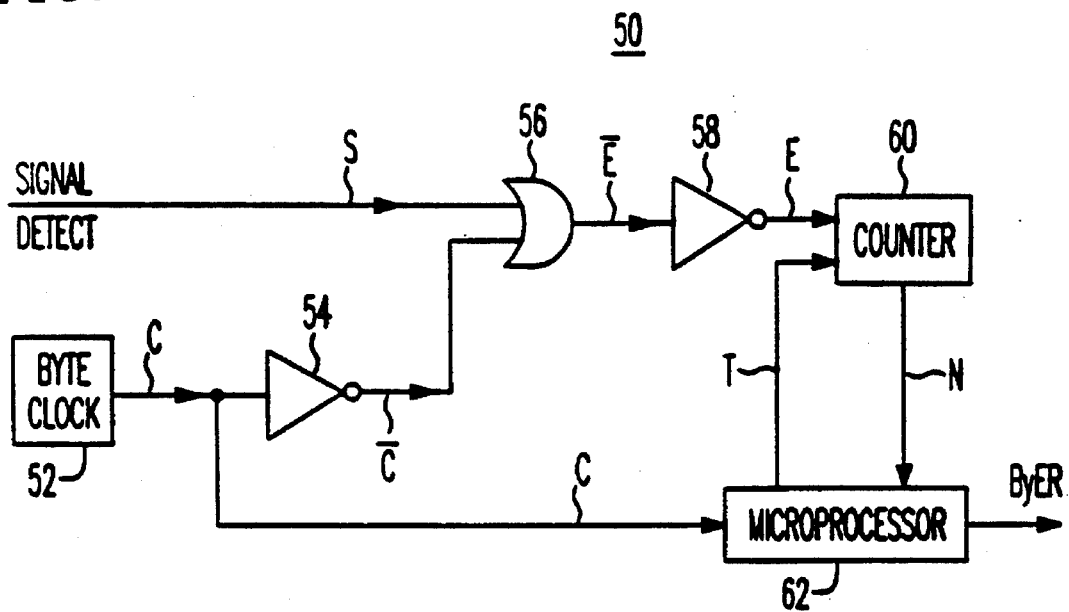
FIG. 4 illustrates yet another embodiment of the present invention, utilizing in particular a complement byte clock signal.
Figure 5:
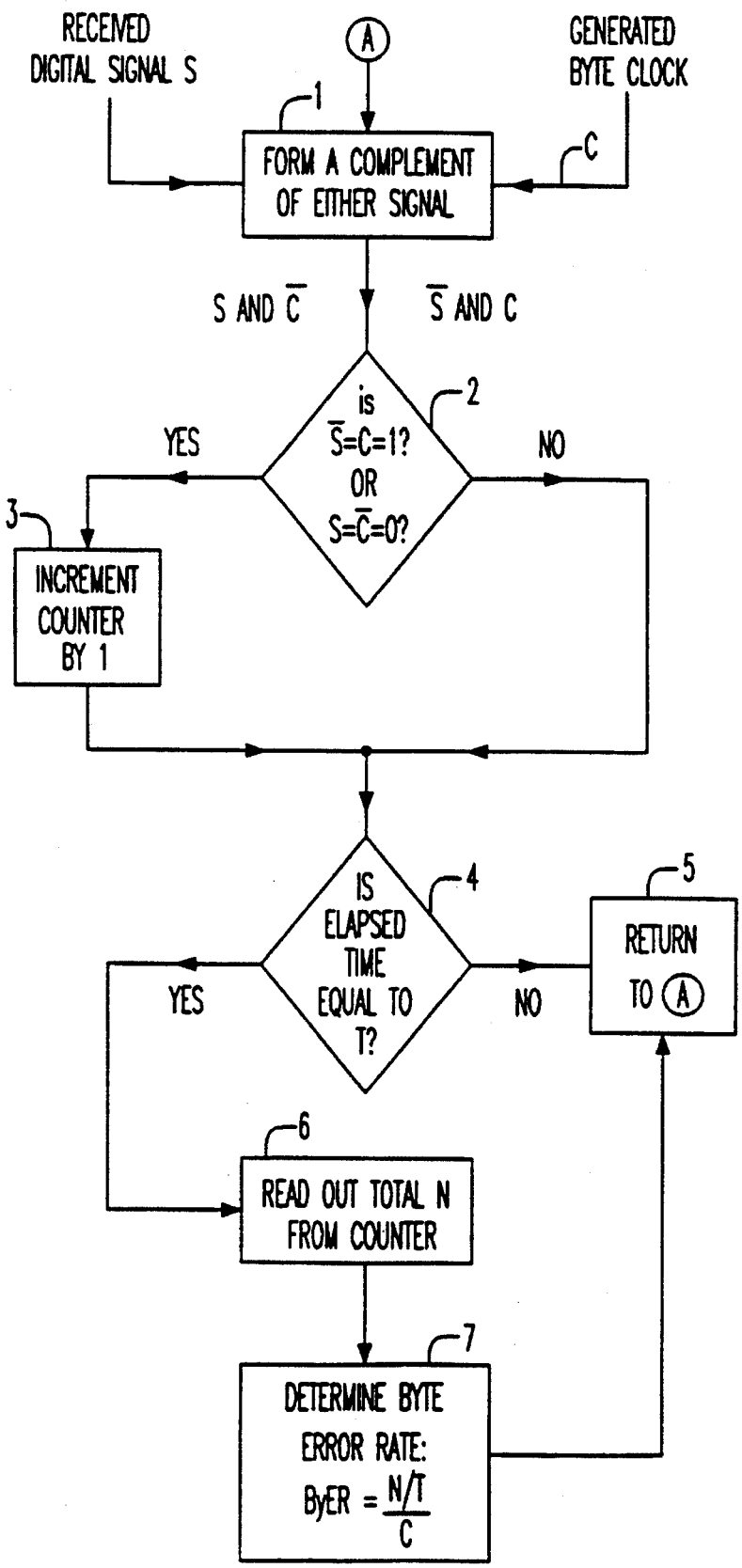
FIG. 5 contains a flowchart illustrating in particular the various functions utilized in practicing the arrangement of the present invention.

An alternative arrangement 50 for providing the same ByER determination is shown in FIG. 4. In this case, an inverted byte clock $\overline{C}$ is formed by passing the output C from a clock source 52 through an inverter 54 (the timing diagram of signal $\overline{C}$ is also illustrated in FIG. 2). Inverted clock signal $\overline{C}$ and received signal S are subsequently applied as separate inputs to an OR gate 56. As is well-known in the art, the only time an OR gate will provide an output of logic "0" is when both inputs are logic "0", which in this case is indicative of an error in the received signal S byte rate. Therefore, the output from NOR gate 56, denoted $\overline{E}$ will be at logic "0" when an error has occurred. Signal $\overline{E}$ subsequently passes through an inverter 58 such that an error signal E is formed which will be a value of logic "1" when an error is present. Signal E is then utilized as the increment input to a counter 60. As with the arrangements described above, after a predetermined period of time T, the total number of errors N is read out of counter 60 and used to determine the byte error rate (ByER).

It is to be understood that there exist many other logic arrangements which may be used to provide an output similar to those described above. Further, a microprocessor is not considered to be a necessary element of the present invention and various other arrangements may be used to determine the byte error rate.

I claim:

1. An arrangement for detecting a byte error rate in a received digital signal S, the arrangement comprising:

means for generating a byte clock signal C at a predetermined frequency;

inverting means for forming a complement of either one of the received digital signal S and byte clock signal C ($\overline{S}$ or $\overline{C}$);

means for comparing the complement signal ($\overline{S}$ or $\overline{C}$) to the other signal (C or S) and providing an error signal E as an output when both said complement signal and said other signal comprise the same logic value; and counting means coupled to the output of the comparing means for incrementing at each occurrence of said error signal E and for providing as an output, after a predetermined period of time T, a total number N of occurrences, where the byte error rate is defined as $$\frac{N/T}{C}.$$

2. An arrangement as defined in claim 1 wherein the arrangement further comprises:

computer means responsive to the byte clock signal C and the output signal N from the counting means for generating an elapsed time signal T and determining the byte error rate.

3. An arrangement as defined in claim 1 or 2 wherein the received digital signal S is applied as an input to the inverting means to form a complement received signal $\overline{S}$; and said complement received signal $\overline{S}$ and byte clock signal C are applied as separate inputs to the comparing means such that the error signal output from said comparing means comprises a value of logic "1" when both said complement received signal $\overline{S}$ and byte clock signal C are logic "1" values.

4. An arrangement as defined in claim 1 or 2 wherein the inverting means comprises a NAND gate, with both inputs to said NAND gate coupled to receive the same input signal.

5. An arrangement as defined in claim 4 wherein the received digital signal S is applied as both inputs to the NAND gate to form as the output therefrom the complement received signal $\overline{S}$.

6. An arrangement as defined in claim 4 wherein the byte clock signal C is applied as both inputs to the NAND gate to form as the output therefrom a complement clock signal $\overline{C}$.

7. An arrangement as defined in claim 1 or 2 wherein the comparing means comprises an AND gate.

8. An arrangement as defined in claim 1 or 2 wherein the comparing means comprises:

a first NAND gate coupled to receive as separate inputs the complement signal ($\overline{S}$ or $\overline{C}$) and the other signal (C or S) and form as an output a complement error signal ($\overline{E}$); and a second NAND gate coupled to receive as both inputs to complement error signal output from said first NAND gate and provide as an output the error signal E.

9. An arrangement as defined in claim 1 or 2 wherein the byte clock signal is applied as the output to the inverting means to form a complement byte clock signal ($\overline{C}$);

said complement byte signal ($\overline{C}$) and received digital signal S being applied as separate inputs to the comparing means such that the error signal comprises a value of logic "1" when both said complement byte clock signal ($\overline{C}$) and received signal (S) are logic "0" values.

10. An arrangement as defined in claim 9 wherein said comparing means comprises:

an NOR gate responsive at separate inputs to the complement byte clock signal and received data signal to provide an output ($\overline{E}$) of logic "0" when both input signals comprise logic "0" values; and an inverter coupled to the output of said OR gate for providing as an output the error signal of logic value "1" when the complement byte clock signal and received data signal are both logic "0" values.

11. An arrangement for detecting a byte error rate in a received digital signal S, the arrangement comprising:

inverting means responsive to the received digital signal S to form as an output a complement received signal $\overline{S}$;

means for generating a byte clock signal C at a predetermined frequency;

an AND gate responsive at separate inputs to said complement received signal $\overline{S}$ and said byte clock signal C and providing as an output an error signal E, wherein error signal E will comprise a value of logic "1" only when both input signals are logic "1" values; and counting means responsive to said error output signal E from said AND gate for generating an increment at each occurrence of a logic "1" value and providing after a predetermined period of time T, an output signal N defined as a total number of occurrences, the byte error rate being defined as $$\frac{N/T}{C}.$$

12. An arrangement for detecting the byte error rate in a received digital signal S, the arrangement comprising:

a first NAND gate coupled at both inputs to the received digital signal to form as an output a complement received signal $\overline{S}$;

means for generating a byte clock signal C at a predetermined frequency;

a second NAND gate responsive at separate inputs to said complement received signal $\overline{S}$ and said byte clock signal C and providing as an output a complement error signal $\overline{E}$ of a logic value "0" when both input signals are logic "1" values; and a third NAND gate responsive at both inputs to said complement error signal $\overline{E}$ to form as an output the inverse thereof, defined as the error signal E; and counting means responsive to the error output signal E from said third NAND gate for generating an increment at each occurrence of a logic "1" value and providing, after a predetermined period of time T, an output signal N defined as a total number of occurrences, wherein the byte error rate is defined as $$\frac{N/T}{C}.$$

* * * * *